United States Patent
Akiyama

(10) Patent No.: US 10,439,729 B2
(45) Date of Patent: Oct. 8, 2019

(54) OPTICAL DEVICE AND OPTICAL APPARATUS

(71) Applicants: FUJITSU LIMITED, Kawasaki-shi, Kanagawa (JP); PHOTONICS ELECTRONICS TECHNOLOGY RESEARCH ASSOCIATION, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 16/117,958

(22) Filed: Aug. 30, 2018

(65) Prior Publication Data

US 2019/0097732 A1    Mar. 28, 2019

(30) Foreign Application Priority Data

Sep. 27, 2017   (JP) ................. 2017-186440

(51) Int. Cl.
  *H04J 14/02*    (2006.01)
  *H04B 10/572*   (2013.01)
  *G02B 6/293*    (2006.01)

(52) U.S. Cl.
  CPC ....... *H04B 10/572* (2013.01); *G02B 6/29349* (2013.01); *G02B 6/29352* (2013.01); *G02B 6/29385* (2013.01); *H04J 14/0201* (2013.01); *H04J 14/0221* (2013.01)

(58) Field of Classification Search
  CPC .... H04J 14/02; H04J 14/0227; H04J 14/0209; H04J 14/0201; H04B 10/0795; H04B 10/07955; G02B 6/29349; G02B 6/29385; G02B 6/29352

USPC .... 398/79, 83, 82, 85, 87, 81, 158, 159, 33, 398/25, 26, 27, 34, 38; 385/24, 37, 27, 385/15, 31, 39

See application file for complete search history.

(56) References Cited

U.S. PATENT DOCUMENTS

| | | | |
|---|---|---|---|
| 6,895,141 B2 * | 5/2005 | Miyata | H04B 10/25073 385/15 |
| 8,818,194 B2 * | 8/2014 | Little | H04J 14/02 385/17 |
| 2004/0005150 A1 * | 1/2004 | Takeshita | H04B 10/00 398/32 |

FOREIGN PATENT DOCUMENTS

| JP | 2-44303 A | 2/1990 |
|---|---|---|
| JP | 2010-54620 A | 3/2010 |

(Continued)

*Primary Examiner* — Hanh Phan
(74) *Attorney, Agent, or Firm* — Westerman, Hattori, Daniels & Adrian, LLP

(57) ABSTRACT

A demultiplexing unit that is provided in an optical device and performs demultiplexing into a plurality of optical signals having wavelengths different from each other includes a plurality of optical filters that are coupled in multiple stages and in which a period of a peak wavelength of a transmission spectrum differs among different stages, a monitoring optical filter coupled to one of the plurality of optical filters, a monitoring photodetector coupled to the output side of the monitoring optical filter, and a plurality of wavelength adjustment units that are provided individually for the plurality of optical filters and the monitoring optical filter and cause wavelength shifts of an equal amount in a same direction.

17 Claims, 13 Drawing Sheets

(56) References Cited

FOREIGN PATENT DOCUMENTS

| JP | 2013-186358 A | 9/2013 |
| JP | 2014-182259 A | 9/2014 |

* cited by examiner

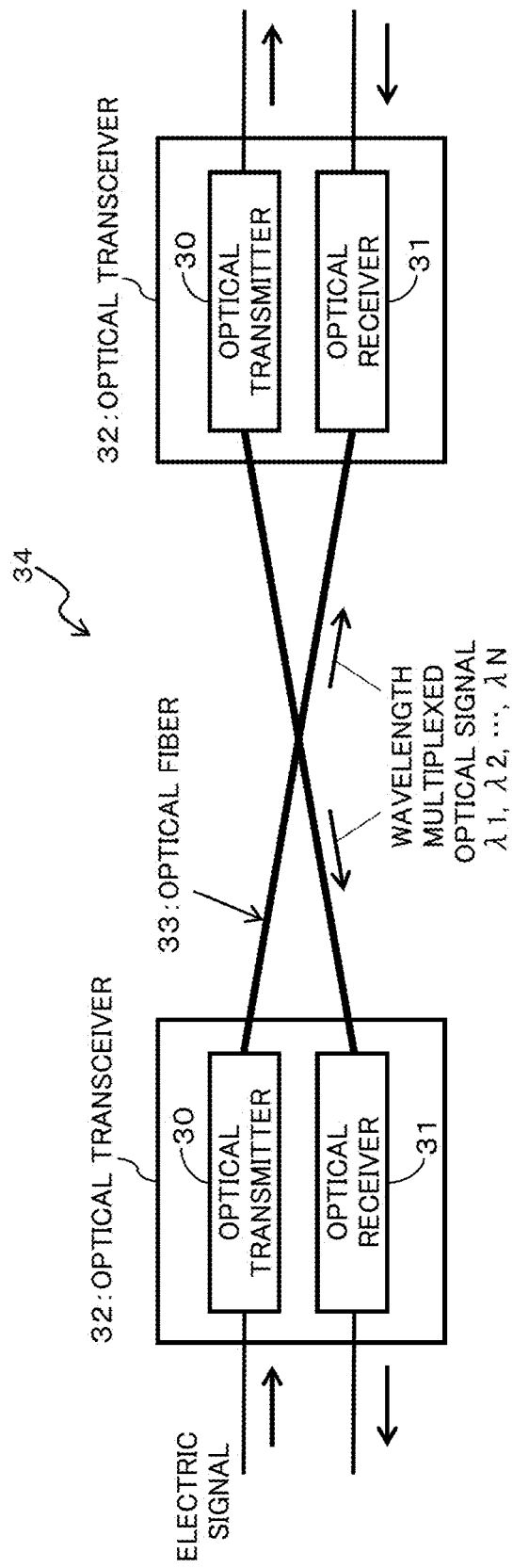

OPTICAL DEVICE AND OPTICAL APPARATUS

CROSS-REFERENCE TO RELATED APPLICATION

This application is based upon and claims the benefit of priority of the prior Japanese Patent Application No. 2017-186440, filed on Sep. 27, 2017, the entire contents of which are incorporated herein by reference.

FIELD

The embodiments discussed herein are related to an optical device and an optical apparatus.

BACKGROUND

A performance of an information processing system depends upon the speed of an arithmetic operation apparatus and a mutual coupling medium, and the speed of the arithmetic operation apparatus continuously implements rapid improvement by scaling by fine processing of integration circuits (for example, silicon integration circuits).

According to the rapid improvement of the speed of the arithmetic operation apparatus, also increase of the speed of the mutual coupling medium is required, and significant downsizing and increase in speed are demanded.

What is drawing attention as means for this is mutual coupling by optical communication in which an optical integration circuit (for example, a silicon integration circuit) and an optical fiber are used.

One of technologies for improving the speed per one optical fiber is wavelength division multiplexing (WDM).

Where this WDM is used, a technology for demultiplexing a WDM signal into a plurality of optical signals having wavelengths different from each other (Demultiplex: Dmx) is demanded.

SUMMARY

According to one aspect of the embodiment, an optical device includes a demultiplexing unit that performs demultiplexing into a plurality of optical signals having wavelengths different from each other, wherein the demultiplexing unit includes a plurality of optical filters that are coupled in multiple stages and in which a period of a peak wavelength of a transmission spectrum differs among different stages, a monitoring optical filter coupled to one of the plurality of optical filters, a monitoring photodetector coupled to the output side of the monitoring optical filter, and a plurality of wavelength adjustment units that are provided individually for the plurality of optical filters and the monitoring optical filter and cause wavelength shifts of an equal amount in a same direction.

According to another aspect of the embodiment, an optical apparatus includes an optical device including a demultiplexing unit that performs demultiplexing into a plurality of optical signals having wavelengths different from each other, and a controller coupled to the optical device, wherein the demultiplexing unit includes a plurality of optical filters that are coupled in multiple stages and in which a period of a peak wavelength of a transmission spectrum differs among different stages, a monitoring optical filter coupled to one of the plurality of optical filters, a monitoring photodetector coupled to the output side of the monitoring optical filter, and a plurality of wavelength adjustment units that are provided individually for the plurality of optical filters and the monitoring optical filter and cause wavelength shifts of an equal amount in a same direction, and the controller performs control for the plurality of wavelength adjustment units based on a value detected by the monitoring photodetector.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 13 is a schematic view depicting a configuration of the optical apparatus (optical transceiver) according to the present embodiment.

DESCRIPTION OF EMBODIMENTS

Incidentally, as the Dmx technology, a technology is available in which a plurality of optical filters having peak wavelength periods in a transmission spectrum different from each other are coupled in multiple stages.

However, the technology has a subject that wavelength deviations of an equal amount in the same direction to the long wavelength side or the short wavelength side appear in each of the optical filters by an influence, for example, of variation upon fabrication, a temperature variation or the like, resulting in appearance of wavelength deviations in a plurality of demultiplexed optical signals, which causes loss or crosstalk.

The present embodiment reduces a wavelength deviation and suppresses loss or crosstalk.

In the following, the optical device and the optical apparatus according to the present embodiment are described with reference to FIGS. 1 to 13.

Figure 1:
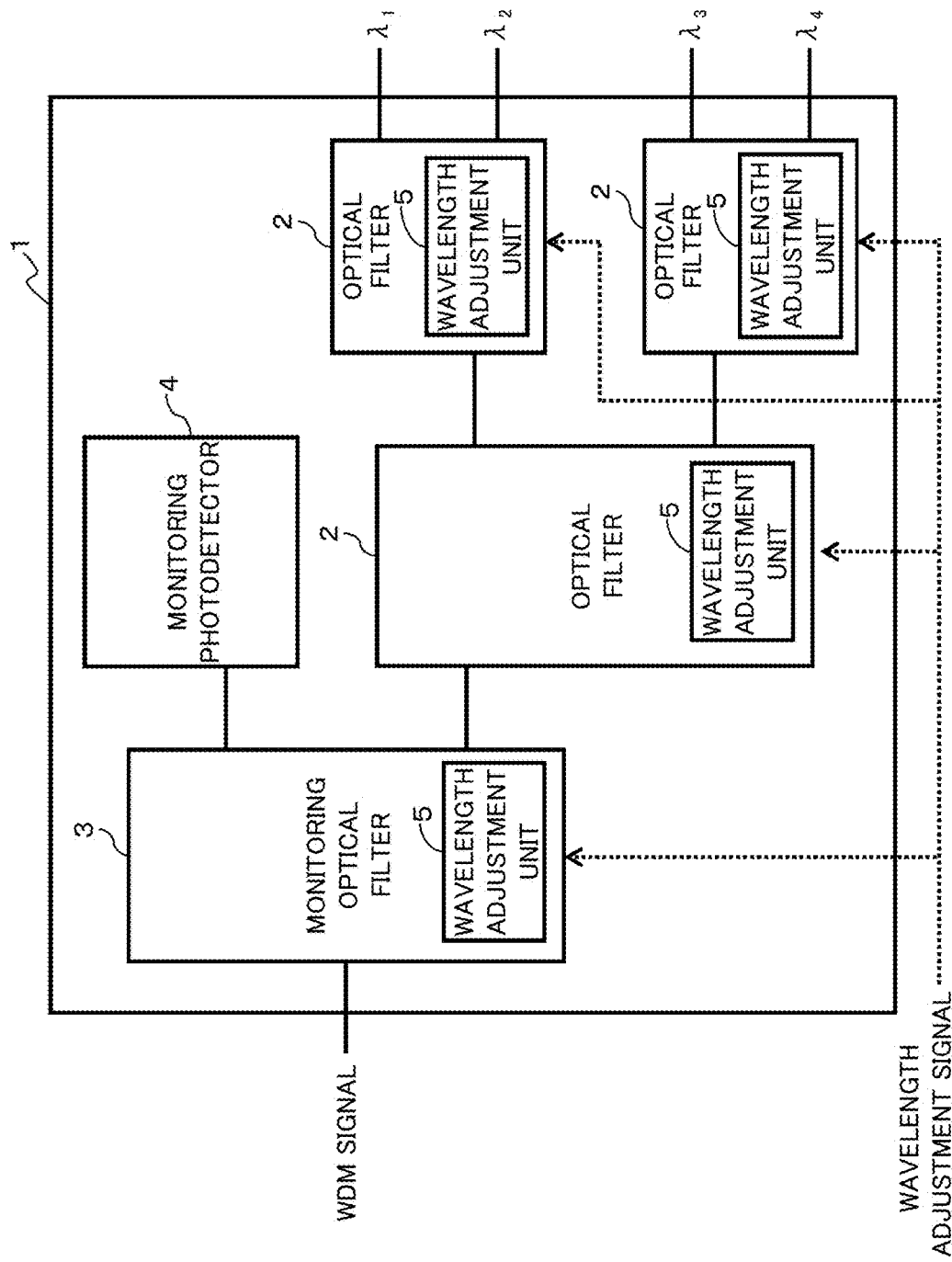
FIG. 1 is a schematic view depicting a configuration of an optical device according to an embodiment.

As depicted in FIG. 1, the optical device according to the present embodiment includes a demultiplexing unit 1 that performs demultiplexing into a plurality of optical signals having wavelengths different from each other. The demultiplexing unit 1 further includes a plurality of optical filters 2 that are coupled in multiple stages and in which the period of a peak wavelength of a transmission spectrum differs among different stages. In this manner, the demultiplexing unit 1 is a multi-stage filter type demultiplexer.

Here, the demultiplexing unit 1 is provided in the optical device and has a function for demultiplexing (separating) wavelength division multiplexed (WDM) signal light into a plurality of optical signals (here, $\lambda_1$ to $\lambda_4$) having wavelengths different from each other. Therefore, the demultiplexing unit 1 is referred to also as wavelength division multiplexing device, wavelength demultiplexing device, demultiplexer or wavelength separation circuit.

Figure 5:
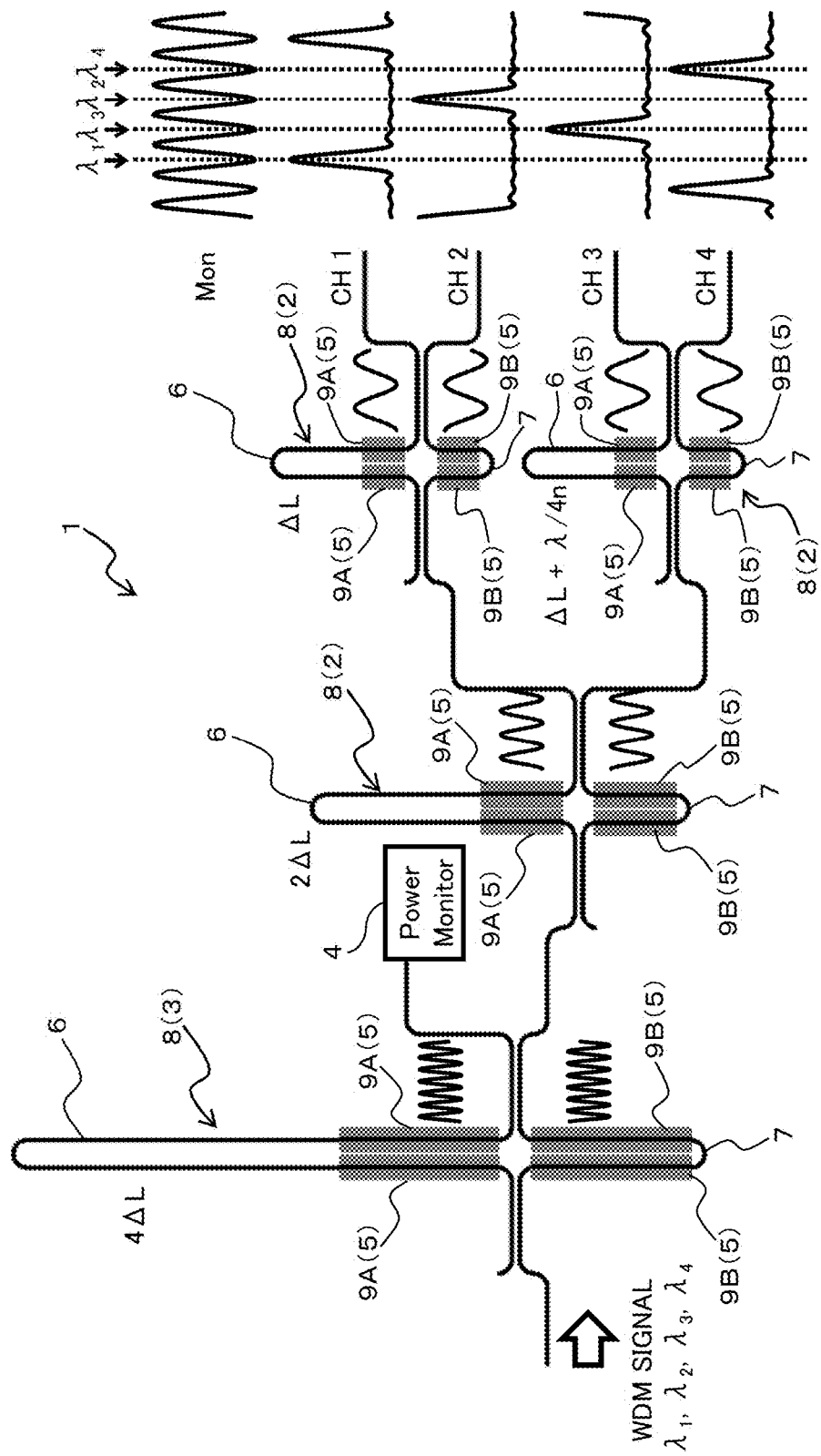
FIG. 5 is a schematic top plan view depicting a configuration of the optical device according to the present embodiment.

Further, each of the optical filters 2 in the stages has a period of a peak wavelength of a transmission spectrum, which is equal to an integral number of times of the shortest period (for example, refer to FIG. 5).

It is to be noted that the "period equal to an integral number of the shortest period" includes not only a period that fully coincides with an integral number of times of the shortest period but also a period that almost coincides with an integral number of times of the shortest period (for example, a period whose error is within a range of approximately 10%).

Especially, in the present embodiment, the demultiplexing unit 1 further includes a monitoring optical filter 3 coupled to one of the plurality of optical filters 2, a monitoring photodetector 4 coupled to the output side of the monitoring optical filter 3 and a plurality of wavelength adjustment units 5 that are provided individually for the plurality of optical filters 2 and the monitoring optical filter 3 and cause wavelength shifts of an equal amount to be generated in a same direction.

Figure 6:
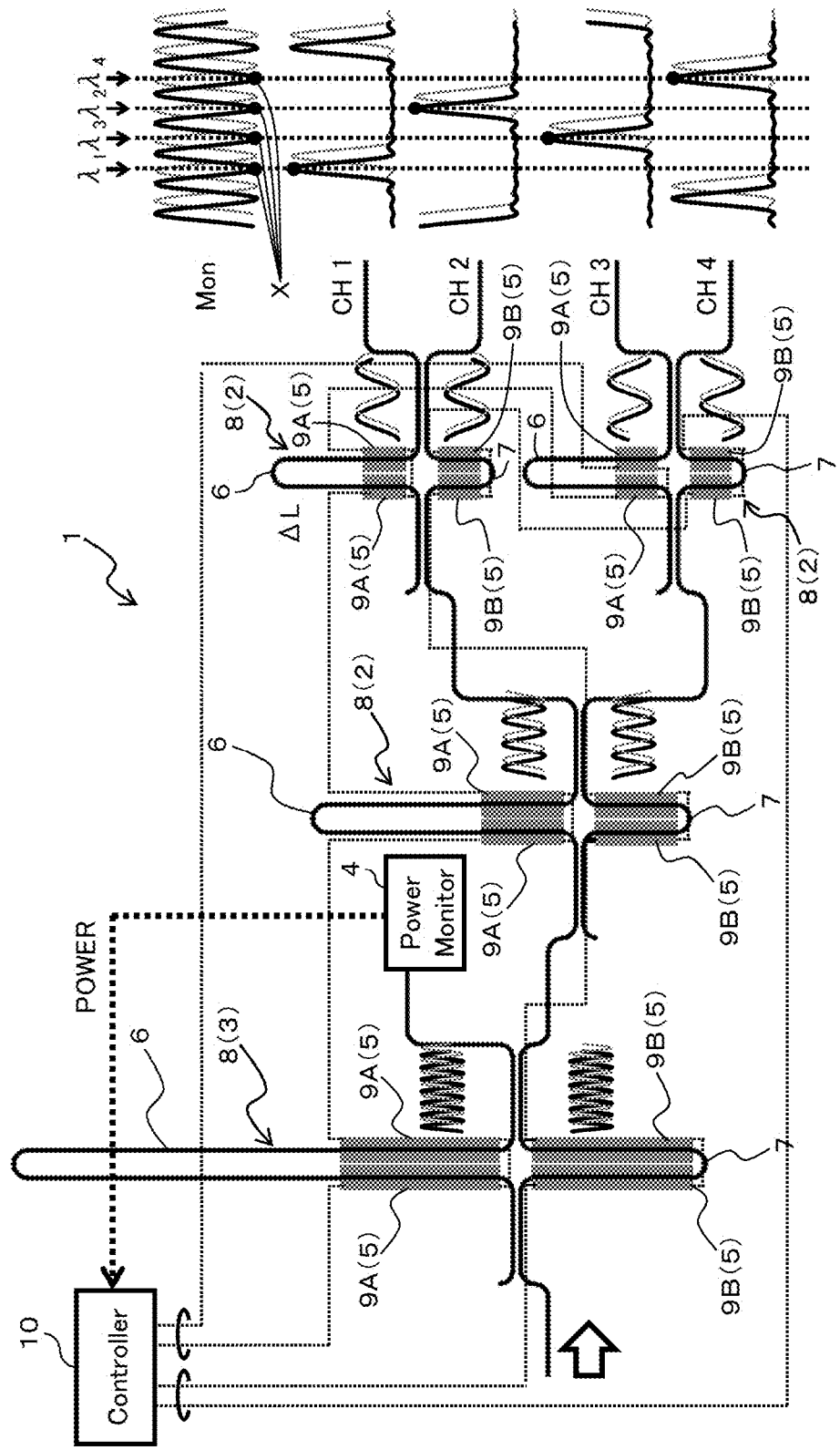
FIG. 6 is a schematic top plan view depicting a configuration of the optical device and an optical apparatus including the optical device according to the present embodiment.

Consequently, even in the case where wavelength deviations of an equal amount in a same direction to the long wavelength side or the short wavelength side occur in each optical filter 2 or 3 of the plurality of optical filters 2 and the monitoring optical filter 3 by an influence or the like, for example, of dispersion upon fabrication (shape dispersion, structure dispersion) or temperature variation, the wavelength deviations can be compensated for by generating a wavelength shift of an equal amount to that of a wavelength deviation in the direction opposite to that of the wavelength deviation (for example, refer to FIG. 6).

As a result, the wavelength deviation of each of the plurality of optical signals demultiplexed by the demultiplexing unit 1 can be compensated for such that the wavelengths of the plurality of optical signals demultiplexed by the demultiplexing unit 1 coincide with or substantially coincide with channel wavelengths, respectively, and occurrence of loss or crosstalk can be suppressed (for example, refer to FIG. 6).

It is to be noted that, in order to suppress occurrence of a wavelength deviation, for example, by dispersion upon fabrication, it may be expected to increase the processing accuracy when the optical filters 2 and 3 are formed. However, this increases the cost, and even if it is tried to increase the processing accuracy, there is a restriction.

Figure 10:
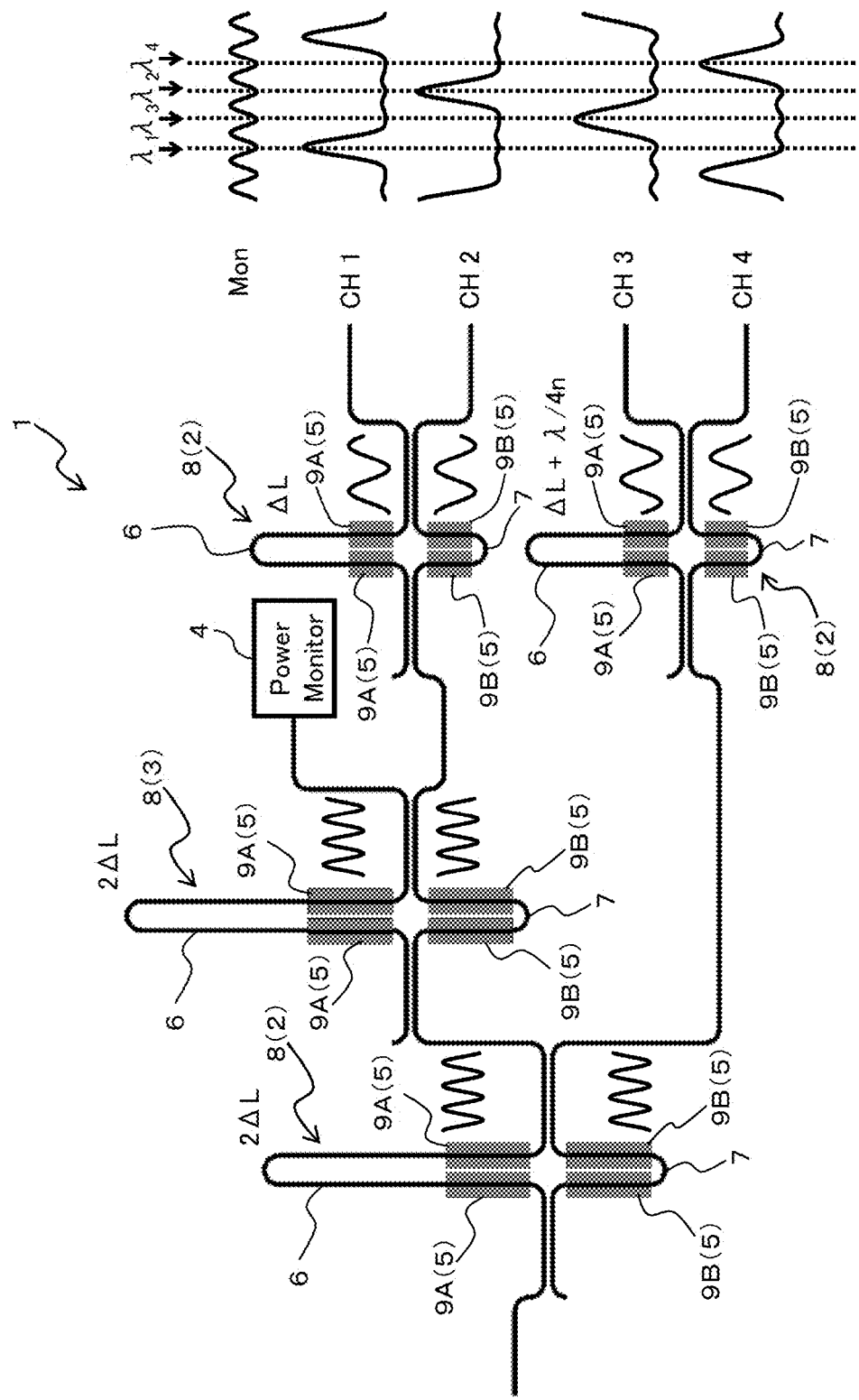
FIG. 10 is a schematic top plan view depicting a configuration of a modification to the optical device according to the present embodiment.
Figure 11:
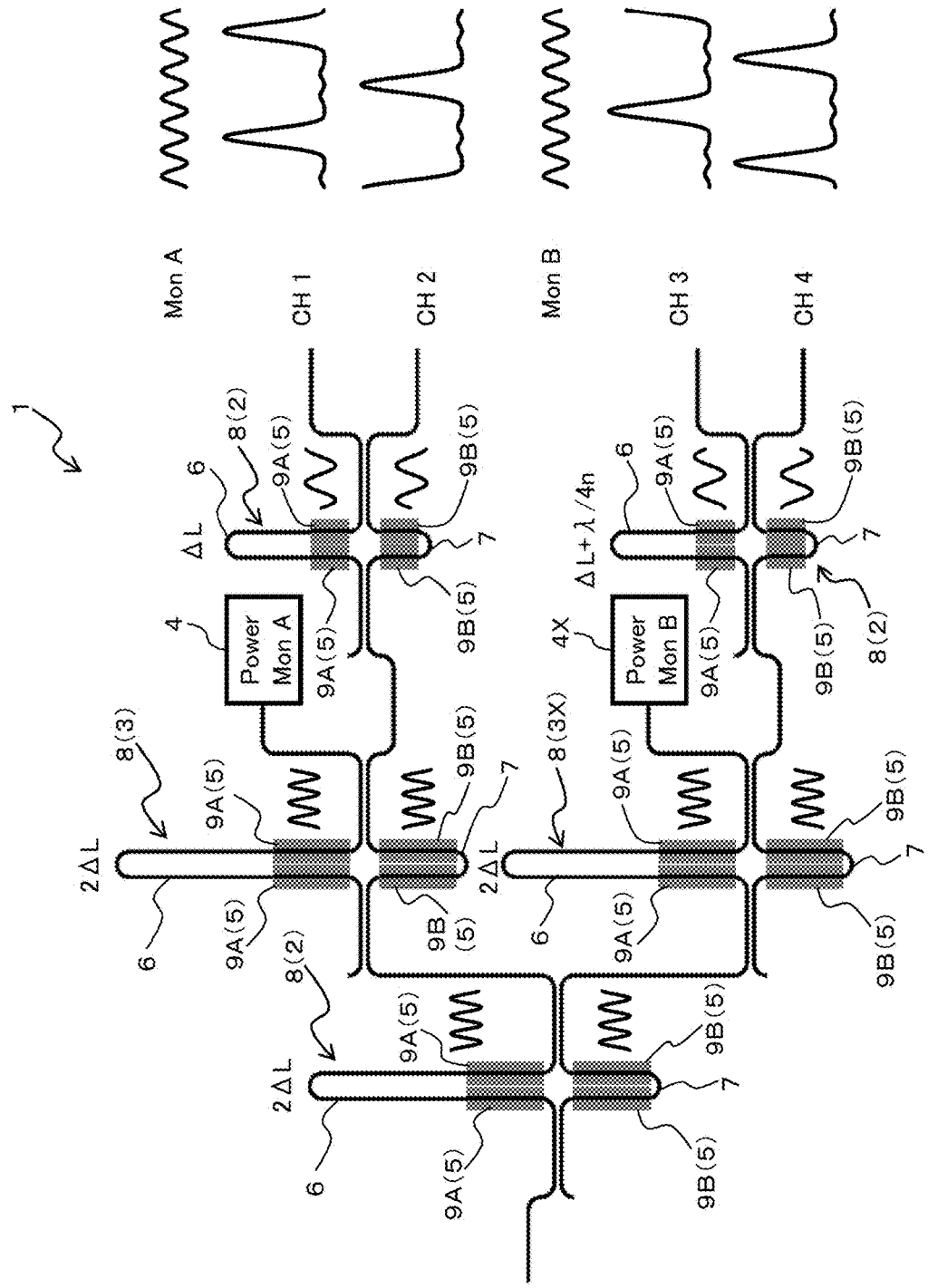
FIG. 11 is a schematic top plan view depicting a different configuration of the modification to the optical device according to the present embodiment.

Here, the monitoring optical filter 3 is provided in a preceding stage, between different stages or in a following stage of the plurality of optical filters 2 coupled in multiple stages, (for example, refer to FIGS. 5, 10 and 11). In particular, the plurality of optical filters 2 and monitoring optical filter 3 are coupled in multiple stages.

Here, for the optical filters 2 and the monitoring optical filter 3, for example, an asymmetric Mach-Zehnder (Asymmetric Mach-Zehnder: AMZ) interferometer, a ring resonator, a Michelson's interferometer, a Fabry-Perot filter and so forth can be used.

Each of the optical filters 2 and the monitoring optical filter 3 is a two-output optical filter and is an optical filter that has spectra that are inversed between the two output ports.

While optical filters 2 in the next stage are coupled to the two output ports of an optical filter 2, respectively, the optical filter 2 in the next stage is coupled to one of the two output ports of the monitoring optical filter 3 and the monitoring photodetector 4 is coupled to the other one of the two output ports of the monitoring optical filter 3.

It is to be noted that it is possible to consider that at least one of the plurality of optical filters coupled in multiple stages is used as the monitoring optical filter 3 and the monitoring photodetector 4 is coupled to one of the two output ports of the monitoring optical filter 3.

Further, for the monitoring photodetector 4, for example, a photodetector (PD) or the like can be used.

Further, the wavelength adjustment unit 5 has a function for shifting a wavelength (peak wavelength of a transmission spectrum) that transmits through each optical filters 2 and 3 of the plurality of optical filters 2 and the monitoring optical filter 3, for example, by application of current or voltage by an equal amount in a same direction toward the long wavelength side or the short wavelength side. As hereinafter described, a wavelength adjustment signal is inputted from a controller (control unit) 10 to the wavelength adjustment unit 5.

It is to be noted that the "shifting (the wavelengths) through the optical filters 2 and 3 by an equal amount" includes not only a case in which the wavelength shift amounts in the optical filters 2 and 3 fully coincide with each other but also a case in which the wavelength shift amounts in the optical filters 2 and 3 substantially coincide with each other (for example, a case in which the error is within a range of an error of approximately 10%).

Here, for the wavelength adjustment unit 5, for example, a structure that can electrically adjust an optical path length such as a heater can be used.

It is to be noted that the demultiplexing unit 1 is referred to sometimes as demultiplexer. Further, the monitoring photodetector 4 is referred to also as power monitor. Further, the wavelength adjustment unit 5 is referred to also as wavelength adjustment mechanism.

Incidentally, as depicted in FIG. 5, it is preferable to configure the plurality of optical filters 2 and the monitoring optical filter 3 so as to include each an asymmetrical Mach-Zehnder interferometer 8 that includes a first arm waveguide 6 and a second arm waveguide 7 that have optical path lengths different from each other.

In this case, the optical path lengths of the asymmetrical Mach-Zehnder interferometers 8 as the plurality of optical filters 2 are different among different stages.

Further, the asymmetrical Mach-Zehnder interferometer 8 in each stage has an optical path length difference equal to an integral number of times of the shortest optical path length difference.

It is to be noted that the "optical path length difference equal to an integral number of times of the shortest optical path length difference" includes not only an optical path length difference that fully coincides with an integral number of times of the shortest optical path length difference but also an optical path length difference that almost coincides with an integral number of times of the shortest optical path length difference (for example, an optical path length difference whose error is within a range of approximately 10%).

The plurality of wavelength adjustment units 5 are provided for at least one of the first arm waveguide 6 and the second arm waveguide 7 included in the asymmetrical Mach-Zehnder interferometer 8 of each of the plurality of optical filters 2 and the monitoring optical filter 3, and the plurality of wavelength adjustment units 5 may be used as a plurality of optical path length adjustment units 9A (9B) in which the optical path length is varied according to the optical path length difference.

Especially, it is preferable to configure the plurality of wavelength adjustment units 5 as a plurality of first optical path length adjustment units 9A that are provided for the first arm waveguide 6 included in the asymmetrical Mach-Zehnder interferometer 8 of each of the plurality of optical filters 2 and the monitoring optical filter 3 and have the optical path lengths varied according to the optical path length difference to shift the wavelengths to one of the long wavelength side and the short wavelength side and a plurality of second optical path length adjustment units 9B that are provided for the second arm waveguide 7 included in the asymmetrical Mach-Zehnder interferometer 8 of each of the plurality of optical filters 2 and the monitoring optical filter 3 and have the optical path lengths varied according to the optical path length difference to shift the wavelengths to the other one of the long wavelength side and the short wavelength side.

Consequently, since wavelength shifts to both of the long wavelength side and the short wavelength side become possible, a wavelength deviation can be compensated for with lower power consumption.

Incidentally, as depicted in FIG. 6, the optical apparatus according to the present embodiment includes an optical device including the demultiplexing unit 1 configured as described above and the control unit 10 coupled to the optical device.

The control unit 10 performs control for the plurality of wavelength adjustment units 5 on the basis of a value detected by the monitoring photodetector 4.

Here, the control unit 10 is, for example, a controller, and detects a wavelength deviation caused by an influence, for example, of dispersion upon fabrication or temperature variation and controls an input signal (wavelength adjustment signal) to the wavelength adjustment unit 5 in order to compensate for the wavelength deviation.

Here, the control unit 10 controls the input signal to the wavelength adjustment unit 5 such that the value (monitor power) detected by the monitoring photodetector 4 is minimized.

In the following, the present embodiment is described taking, as an example, a case in which an asymmetrical Mach-Zehnder interferometer is used for the optical filters 2 and the monitoring optical filter 3.

First, a configuration that is a premise of the demultiplexing unit 1 (demultiplexing device; Dmx device) provided in the optical device of the present embodiment is described with reference to FIGS. 2 and 3.

Figure 2:
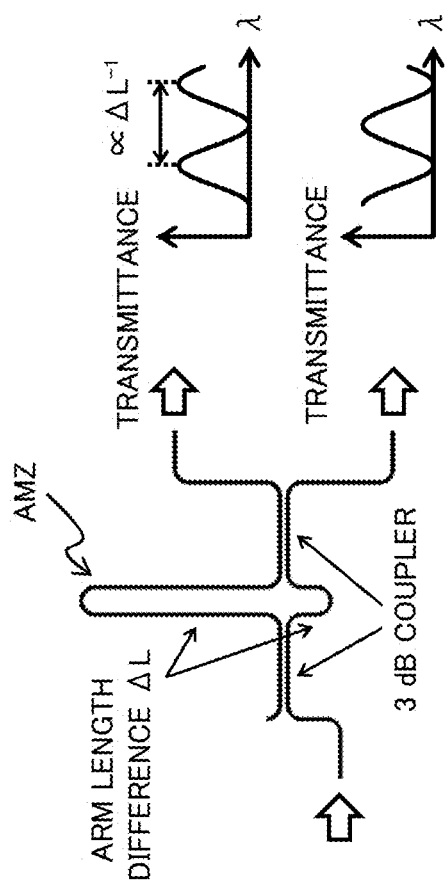
FIGS. 2 and 3 are schematic top plan views illustrating a configuration as a premise of the optical device according to the present embodiment.

As depicted in FIG. 2, the Dmx device is configured from an a symmetrical Mach-Zehnder interferometer (AMZ; optical filter) structured such that light demultiplexed by a 3 dB coupler is multiplexed by another 3 dB coupler after the light passes two optical waveguides (arm waveguides) that have arm lengths (optical path lengths) different from each other by $\Delta L$.

The asymmetrical Mach-Zehnder interferometer has two output ports, and a transmission spectrum thereof has a periodical spectrum. In particular, the transmission spectrum has a raised cosine (Raised Cosine) shape having a period that varies in inverse proportion to the arm length difference (optical path length difference) $\Delta L$. Further, the transmission spectrums of the two output ports have an inversed relationship to each other in an upward and downward direction (spectrum inversion).

Figure 3:
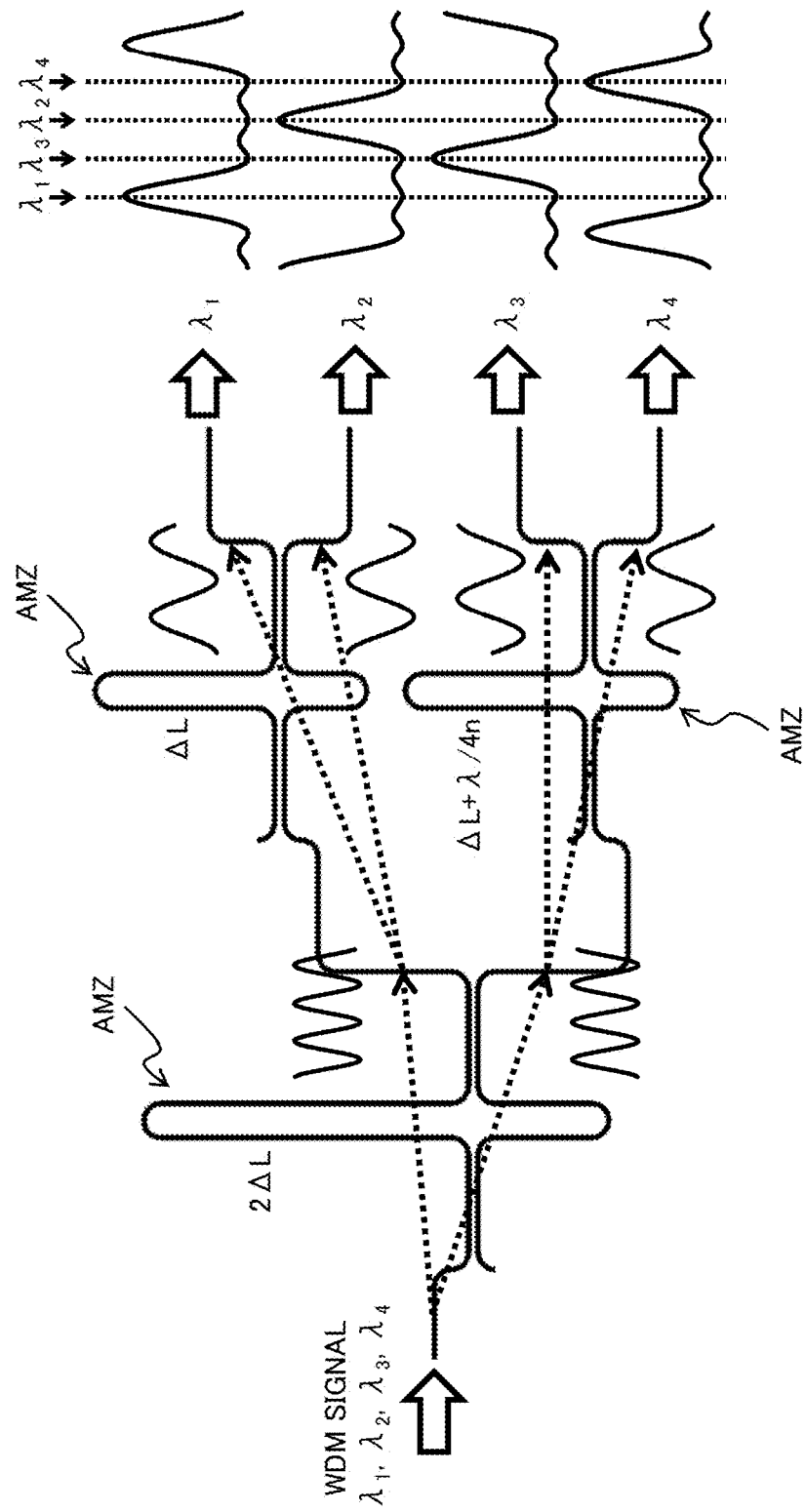

For example, in the case where WDM signal light is to be demultiplexed into four signal light beams (here, $\lambda_1$ to $\lambda_4$) having wavelengths different from each other, as depicted in FIG. 3, asymmetrical Mach-Zehnder interferometers (AMZs) having an arm length difference $\Delta L$ are coupled in multiple stages, one for each of the two output ports of an asymmetrical Mach-Zehnder interferometer (AMZ) having an arm length difference $2\Delta L$ to configure the Dmx device.

Consequently, optical signals (here, $\lambda_1$ to $\lambda_4$) after demultiplexed are obtained from the totaling four output ports of the two asymmetrical Mach-Zehnder interferometers having the arm length difference $\Delta L$.

Here, since the transmission spectrum of the asymmetrical Mach-Zehnder interferometers depends upon the optical path length difference between the two arm waveguides, also a peak wavelength of the transmission spectrum of each output port indicated at the right side in FIG. 3 depends upon the optical path length difference.

Figure 4:
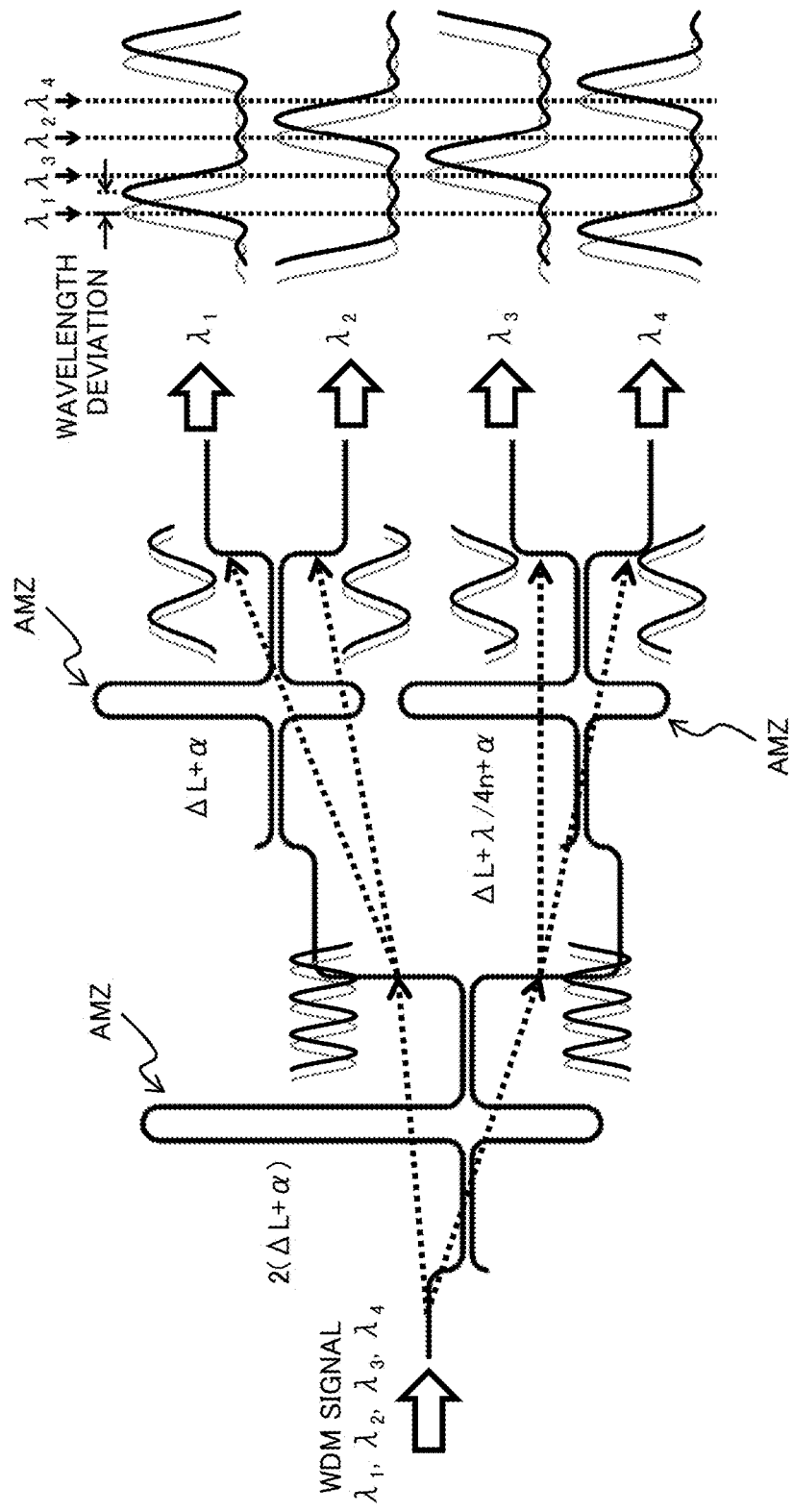
FIG. 4 is a schematic top plan view illustrating a subject in the configuration as a premise of the optical device according to the present embodiment.

However, since the optical path length difference is varied by a refractive index variation by a temperature variation of the optical waveguide and is influenced also by structure dispersion upon fabrication, the optical path length does not necessarily become such as is designed. As a result, as depicted in FIG. 4, also transmission wavelengths of the output ports are varied, which gives rise to a wavelength deviation, resulting in occurrence of loss or crosstalk with a different channel. It is to be noted that, in FIG. 4, a indicates a deviation of the optical path length difference.

In particular, in the asymmetrical Mach-Zehnder interferometers that are influenced, for example, by dispersion upon fabrication or temperature variation and are formed similarly by a same process on a same substrate, wavelength deviations having a same amount in a same direction toward the long wavelength side or the short wavelength side occur and, as a result, a wavelength deviation occurs in each of a plurality of demultiplexed optical signals, resulting in occurrence of loss or crosstalk.

For example, if the width of the core of an optical waveguide becomes greater than a reference value (designed value) by dispersion upon fabrication, then the optical path length increases by an equal amount between the asymmetrical Mach-Zehnder interferometers, and if the thickness of the core becomes greater than a reference value (designed value), then the optical path length becomes long by an equal amount between the asymmetrical Mach-Zehnder interferometers. Conversely, if the width of the core of the optical waveguide becomes smaller than that of the reference value (designed value), then the optical path length decreases by an equal amount between the asymmetrical Mach-Zehnder interferometers, and if the thickness of the core becomes smaller than that of the reference value (designed value), then the optical path length becomes short by an equal amount between the asymmetrical Mach-Zehnder interferometers.

Further, if the temperature becomes higher than a reference temperature, for example, as a result of temperature variation, then the optical path length becomes longer by an equal amount between the asymmetrical Mach-Zehnder interferometers. Conversely, if the temperature becomes lower than the reference temperature, then the optical path length becomes shorter by an equal amount between the asymmetrical Mach-Zehnder interferometers.

Therefore, as depicted in FIG. 4, wavelength deviations of an equal amount occur in a same direction toward the long wavelength side or the short wavelength side in the asymmetrical Mach-Zehnder interferometers, and as a result, a wavelength deviation occurs in a plurality of demultiplexed optical signals, resulting in occurrence of loss or crosstalk.

Therefore, in order to reduce the wavelength deviation to suppress loss or crosstalk, the optical apparatus is configured in the following manner.

In particular, for example, as depicted in FIG. 5, the demultiplexing unit 1 is structured such that the asymmetrical Mach-Zehnder interferometer 8 having an arm length difference (spectrum period of ½) doubled with respect to the greatest arm length difference (shortest spectrum period) is provided as the monitoring optical filter 3 at the input side of the Dmx device having the structure depicted in FIG. 3 and one of the two output ports is coupled to the input port of the structure depicted in FIG. 3 and the other one of the output ports is coupled to a power monitor (monitoring photodetector) 4.

In this case, in the plurality of optical filters 2, the optical path length difference in a stage at the one-stage input side is twice the optical path length difference of the optical filter 2 in a certain stage, and the monitoring optical filter 3 is provided at the input side of the optical filter 2 at the frontmost side from among the plurality of optical filters 2 and the optical path length difference thereof is twice the optical path length difference of the optical filter at the frontmost stage.

Further, the wavelength adjustment units 5 (first optical path length adjustment unit 9A and second optical path length adjustment unit 9B) are provided for both of the arm waveguides 6 and 7 of each asymmetrical Mach-Zehnder interferometer 8.

Furthermore, for example, as depicted in FIG. 6, the controller (control unit) 10 is coupled to the power monitor 4 and the plurality of wavelength adjustment units 5 (first optical path length adjustment unit 9A and second optical path length adjustment unit 9B) provided in the Dmx device configured in such a manner as described above.

Thus, the controller 10 performs control for the plurality of wavelength adjustment units 5 (first optical path length adjustment unit 9A and second optical path length adjustment unit 9B) on the basis of power monitored by the power monitor 4 (namely, a value detected by the monitoring photodetector 4).

Here, by the controller 10 and the plurality of wavelength adjustment units 5 (first optical path length adjustment unit 9A) provided on the one arm waveguide 6 of all asymmetrical Mach-Zehnder interferometers 8, the optical path lengths are varied collectively according to the optical path length difference so as to shift the wavelengths by an equal amount to one of the long wavelength side and the short wavelength side.

Further, by the controller 10 and the plurality of wavelength adjustment units 5 (second optical path length adjustment unit 9B) provided on the other arm waveguide 7 of all asymmetrical Mach-Zehnder interferometers 8, the optical path lengths are varied collectively according to the optical path length difference so as to shift the wavelengths by an equal amount to the other one of the long wavelength side and the short wavelength side.

In this case, as indicated at the right side in FIG. 5 and the right side in FIG. 6, transmission spectrums of totaling four output ports of the two asymmetrical Mach-Zehnder interferometers 8 having the arm length difference ΔL, namely, transmission spectrums of channels CH1 to CH4, can be shaped such that they have a transmission peak at channel wavelengths $\lambda_1$ to $\lambda_4$, and at this time, the transmission spectrum (indicated as Mon at the right side in FIG. 5 and the right side in FIG. 6) of the port (monitor port) to which the power monitor 4 is coupled is minimized at the channel wavelengths $\lambda_1$ to $\lambda_4$ (refer to reference character X in FIG. 6).

Therefore, by adjusting the wavelength by causing all of the asymmetrical Mach-Zehnder interferometers 8 to collectively generate wavelength shifts by an equal amount, for example, by application of an analog signal such that power of the power monitor 4 (value detected by the monitoring photodetector 4) becomes least (is minimized), the transmission spectrums of the four output ports of the two asymmetrical Mach-Zehnder interferometers 8 having the arm length difference ΔL can be shaped such that they have a transmission peak at the channel wavelengths $\lambda_1$ to $\lambda_4$.

For example, the controller 10 and the wavelength adjustment units 5 may be configured such that the wavelength is shifted to the long wavelength side and the short wavelength side in the asymmetrical Mach-Zehnder interferometer 8 and values of the power monitors 4 in the individual cases are acquired, and then the values are compared with each other to decide an increasing or decreasing direction of the power monitor value with respect to the wavelength shift to the long wavelength side and the short wavelength side and such wavelength adjustment is performed repetitively in a direction in which the monitor value decreases.

In particular, the controller (control unit) 10 may perform control for the plurality of first optical path length adjustment units 9A and the plurality of second optical path length adjustment units 9B on the basis of a first detection value acquired from the monitoring photodetector (power monitor) 4 by performing control for the plurality of first optical path length adjustment units 9A and a second detection value acquired from the monitoring photodetector 4 by performing control for the plurality of second optical path length adjustment units 9B such that the value detected by the monitoring photodetector 4 (power monitored by the power monitor 4) is minimized.

It becomes possible to correct (compensate for) a wavelength deviation by fabrication dispersion or by temperature variation. As a result, the subject of loss of light and crosstalk can be solved.

Figure 7:
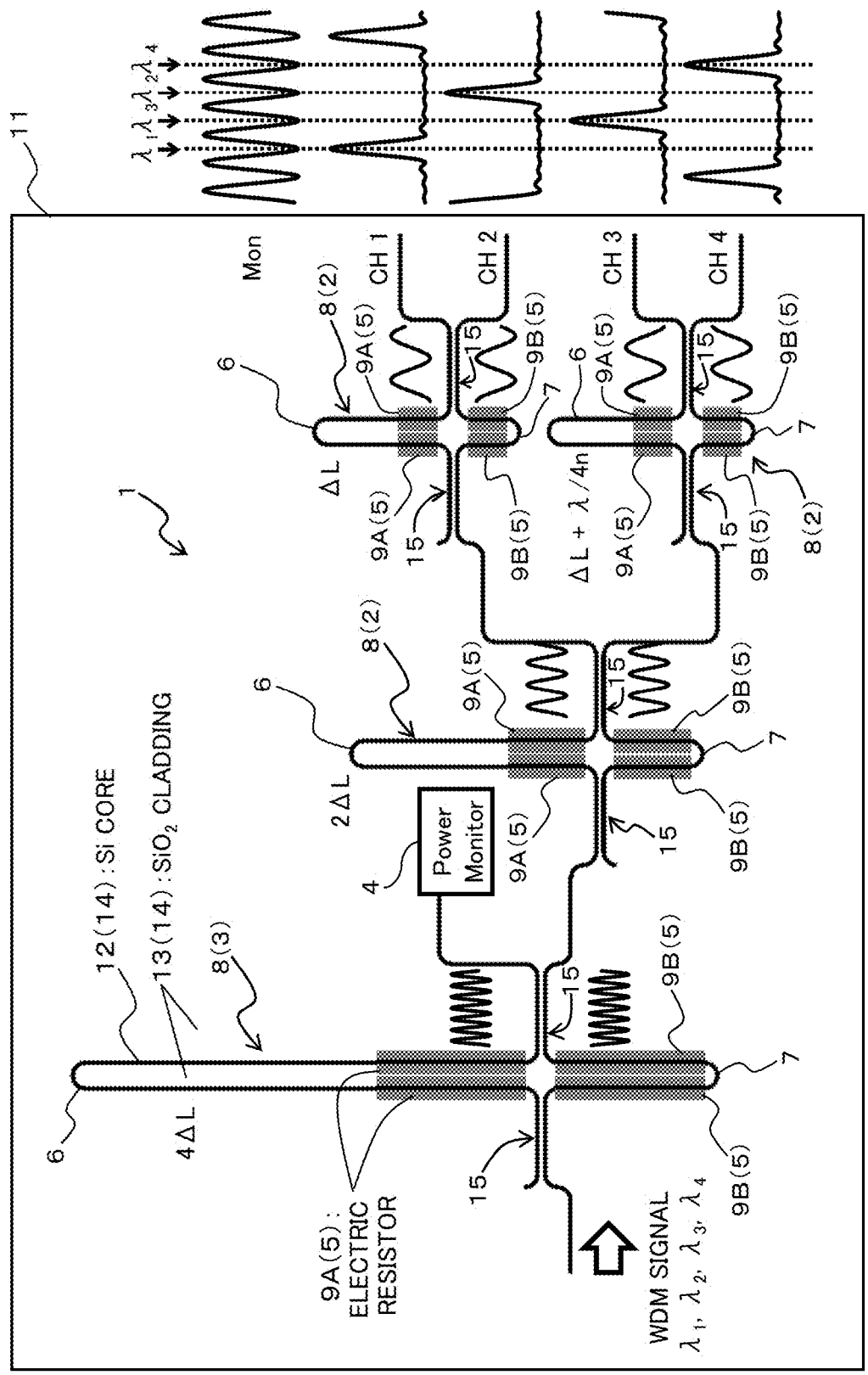
FIG. 7 is a schematic top plan view depicting an example of a configuration of the optical device according to the present embodiment.

Incidentally, the above-described structure depicted in FIG. 5 can be implemented, for example, on a Si integrated circuit 11 as depicted in FIG. 7. In particular, the optical device can be configured as a silicon optical integrated device including a core layer configured from silicon.

In this case, an optical waveguide 14 includes Si obtained by processing an SOI layer of an SOI substrate in a thin linear form as a core 12 and a $SiO_2$ layer formed on a BOX layer and an upper portion of the BOX layer as a cladding 13.

The asymmetrical Mach-Zehnder interferometer 8 has the optical waveguide 14 described above as arms (first arm waveguide 6 and second arm waveguide 7), and a 3 dB coupler 15 is implemented by a directional coupler configured by disposing the portions of the optical waveguide 14 described above closely to each other.

The wavelength adjustment unit 5 (first optical path length adjustment unit 9A and second optical path length adjustment unit 9B) may be configured as a heater formed from an electric resistor such as, for example, W or Ti formed on the arms 6 and 7 such that the temperature of each optical waveguide is varied by heat generated by supplying electric power to the heater thereby to vary the refractive index to implement a waveguide shift.

In this case, the plurality of first optical path length adjustment units 9A are a plurality of first heaters that adjust the temperature of the first arm waveguide 6 and the plurality of second optical path length adjustment units 9B are a plurality of second heaters that adjust the temperature of the second arm waveguide 7.

Here, the arm length (optical path length) of the first arm waveguide 6 is greater than that of the second arm waveguide 7.

Therefore, the plurality of first heaters (first optical path length adjustment units) 9A provided on the first arm waveguides 6 included in the asymmetrical Mach-Zehnder interferometers 8 of the plurality of optical filters 2 and monitoring optical filter 3 vary the optical path length according to the optical path length difference to shift the wavelength to the long wavelength side.

On the other hand, the plurality of second heaters (second optical path length adjustment units) 9B provided on the second arm waveguides 7 included in the asymmetrical Mach-Zehnder interferometers 8 of the plurality of optical filters 2 and monitoring optical filter 3 vary the optical path length according to the optical path length difference to shift the wavelength to the short wavelength side.

It is to be noted that a case is exemplified here in which the plurality of first heaters 9A provided in the asymmetrical Mach-Zehnder interferometers 8 individually have a length according to the optical path length difference. Further, a case is exemplified in which the plurality of second heaters 9B provided in the asymmetrical Mach-Zehnder interferometers 8 individually have a length according to the optical path length difference. Further, a case is exemplified in which the first heaters 9A provided for the first arm waveguides 6 having a long arm length of the asymmetrical Mach-Zehnder interferometers 8 and the second heaters 9B provided for the second arm waveguides 7 having a short arm length have an equal length such that the wavelength shift to the long wavelength side and the wavelength shift to the short wavelength side are equal to each other in shift amount.

It is to be noted that the Si optical waveguide 14 is not limited to a processed SOI substrate and may be formed by processing a formed Si layer.

Further, the 3 dB coupler 15 is not limited to a directional coupler and may be implemented by a multi-mode interferometer (MMI) or some other device.

Further, the arm shape of the asymmetrical Mach-Zehnder interferometer 8 is not limited to the shape depicted in the drawings and may be configured in any form if a demanded optical path length difference can be implemented.

Further, the wavelength adjustment unit 5 can be applied if it is structured such that the optical path length can be adjusted electrically, and is not limited to that described above. For example, a PN junction may be provided in the optical waveguide 14 such that a forward bias voltage and a reverse bias voltage are applied, or an electro-optical material provided in the optical waveguide 14 may be used.

Further, while a case is exemplified here in which a WDM signal is demultiplexed into four wavelengths, the demultiplexing is not limited to this, and the demultiplexing unit 1 can be applied similarly also to a case in which a WDM signal is demultiplexed into 8 wavelengths, 16 wavelengths or more wavelengths. In this case, the number of stages of the asymmetrical Mach-Zehnder interferometers 8 to be coupled in multiple stages increases. For example, in the case where the WDM signal is to be demultiplexed into 8 wavelengths, 16 wavelengths or more wavelengths, the number of stages of the asymmetrical Mach-Zehnder interferometers 8 to be coupled in multiple stages becomes 4, 5 or more stages. In any case, the asymmetrical Mach-Zehnder interferometer 8 as the monitoring optical filter 3 may be provided at the most input side such that the arm length difference is maximized and the power monitor 4 is coupled to one of the two output ports of the asymmetrical Mach-Zehnder interferometer 8.

Figure 8:
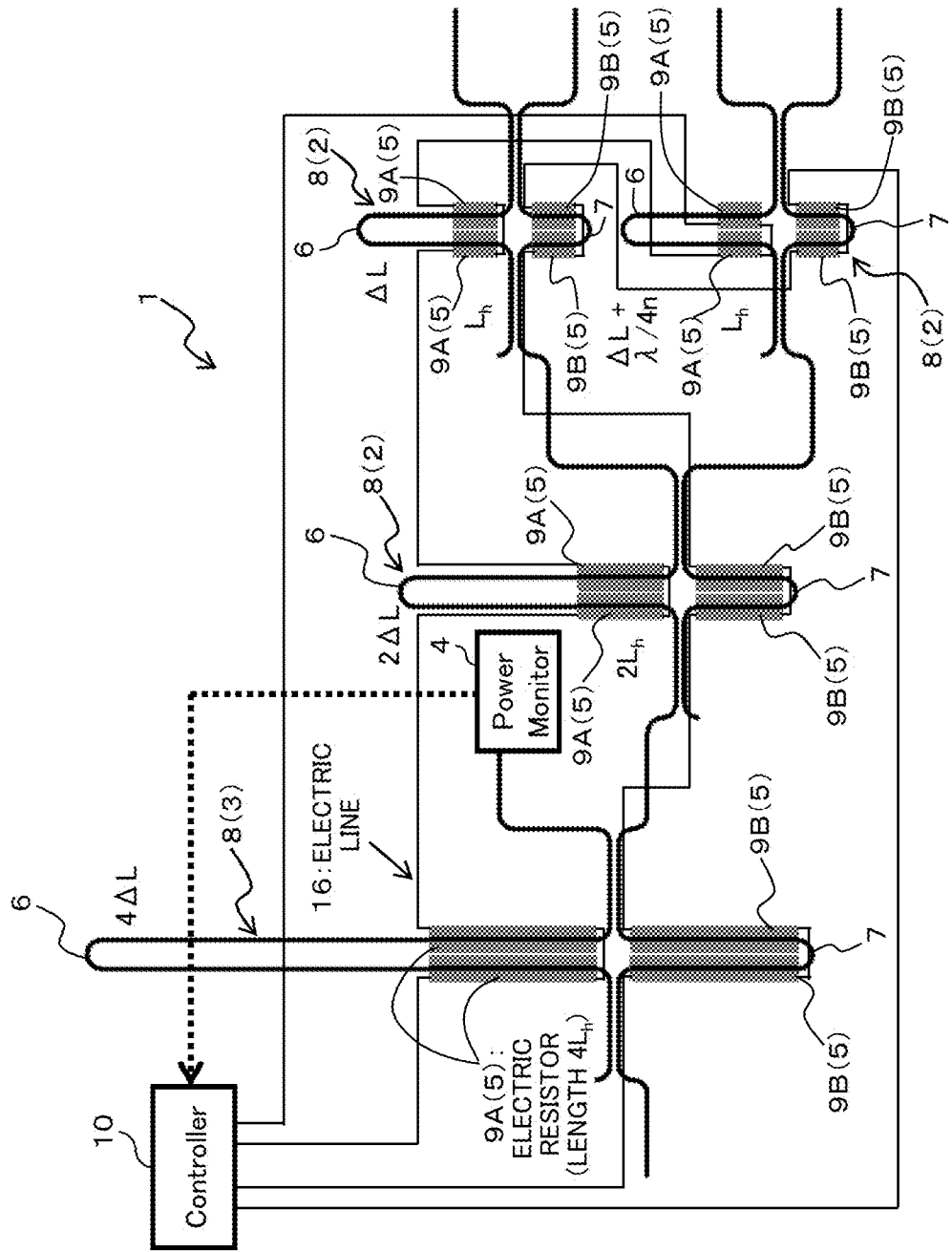
FIG. 8 is a schematic top plan view depicting a configuration of a first particular example of the optical device and the optical apparatus including the optical device according to the present embodiment.
Figure 9:
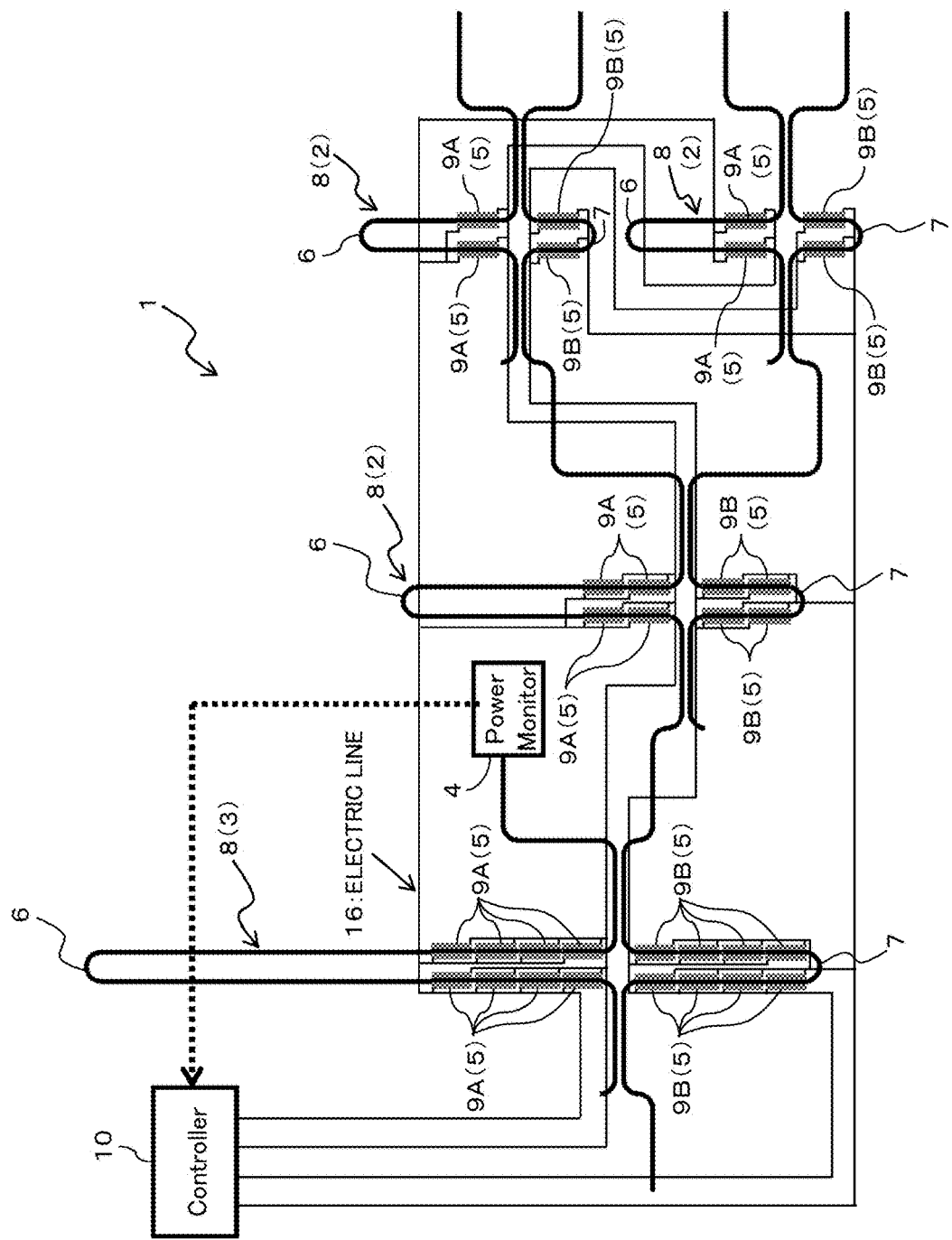
FIG. 9 is a schematic top plan view depicting a configuration of a second particular example of the optical device and the optical apparatus including the optical device according to the present embodiment.

Incidentally, in the case where such a configuration as described above is applied, it is preferable to structure the demultiplexing unit 1 such that current is supplied collectively to all of the first heaters 9A provided for the first arm waveguide (long arm) 6 having a great arm length (optical path length) of the asymmetrical Mach-Zehnder interferometers 8 and current is supplied collectively to all of the second heaters 9B provided for the second arm waveguide (short arm) 7 having a small arm length (for example, refer to FIGS. 8 and 9).

In this case, the demultiplexing unit 1 may be structured such that all of the first heaters 9A provided for the first arm waveguide 6 in which the arm length of the asymmetrical Mach-Zehnder interferometer 8 is great are electrically coupled to each other and current is collectively supplied to all of the first heaters 9A by voltage application to two electric terminals while all of the second heaters 9B provided on the second arm waveguide 7 in which the arm length is small are electrically coupled to each other and current is collectively supplied to all of the second heaters 9B by voltage application to two electric terminals (for example, refer to FIGS. 8 and 9).

In particular, it is preferable to electrically couple the plurality of first heaters 9A to each other such that current collectively flows thereto and electrically couple the plurality of second heaters 9B to each other such that current collectively flows thereto (for example, refer to FIGS. 8 and 9).

Further, the controller (control unit) 10 may perform control for the plurality of first heaters (first optical path length adjustment units) 9A such that current collectively flows to the plurality of first heaters 9A and may perform control for the plurality of second heaters (second optical path length adjustment units) 9B such that current collectively flows to the plurality of second heaters 9B.

This is described below using a first particular example and a second particular example.

As depicted in FIG. 8, in the first particular example, the demultiplexing unit 1 is structured such that values of electric resistance of the first heaters 9A and the second heaters 9B provided for the first arm waveguide (long arm) 6 and the second arm waveguide (short arm) 7 of the asymmetrical Mach-Zehnder interferometers 8, respectively, vary in proportion to values of the optical path length difference of the asymmetrical Mach-Zehnder interferometers 8 and all of the first heaters 9A are coupled in series by an electric line 16 and all of the second heaters 9B are coupled in series by an electric line 16.

It is to be noted that the "value of electric resistance that varies in proportion to the value of the optical path length difference" includes not only a value of electric resistance that fully coincides with a value that varies in proportion to the value of the optical path length difference but also a value of electric resistance that substantially coincides with a value that varies in proportion to the value of the optical path length difference (for example, a value of electric resistance whose error is within a range of approximately 10%).

In this case, the plurality of first heaters 9A are each configured from an electric resistor having an electric resistance value that varies in proportion to the optical path length difference and are coupled in series to each other, and the plurality of second heaters 9B are each configured from an electric resistor having an electric resistance value that varies in proportion to the optical path length difference and are coupled in series to each other.

By configuring the demultiplexing unit 1 in such a manner as described above, it is possible to cause all of the asymmetrical Mach-Zehnder interferometers 8 to collectively generate wavelength shifts by an equal amount, for example, by analog signal application.

Especially, it is possible to implement wavelength shifts of an equal amount by all of the asymmetrical Mach-Zehnder interferometers 8 by providing the first heater 9A and the second heater 9B that have electric resistance values that vary in proportion to the arm length difference of the asymmetrical Mach-Zehnder interferometers 8 separately on the long arm 6 and the short arm 7, respectively, and couple all of the first heaters 9A in series to each other and besides couple all of the second heaters 9B in series to each other.

Further, by configuring the first heaters 9A provided for the long arm 6 of the asymmetrical Mach-Zehnder interferometers 8 and the second heaters 9B provided for the short arm 7 so as to have a same configuration, a wavelength shift by an equal amount can be implemented between the wavelength shift to the long wavelength side and the wavelength shift to the short wavelength side.

For example, if electric resistors having an equal cross-sectional structure are used for the first heater 9A and the second heater 9B such that the resistance value per a unit length is fixed, then by varying the lengths of them so as to vary in proportion to the arm length difference, the electric resistance value can be made vary in proportion to the arm length difference.

Here, the optical path length difference of the asymmetrical Mach-Zehnder interferometer 8 as the monitoring optical filter 3, namely, of the asymmetrical Mach-Zehnder interferometer 8 in the first stage from the input side, is set to 4ΔL, and the optical path length differences of the asymmetrical Mach-Zehnder interferometers 8 as the optical filters 2, namely, of the asymmetrical Mach-Zehnder interferometers 8 in the second and third stages from the input side, are set to 2ΔL and ΔL, respectively. It is to be noted that one of the optical path length differences of the two asymmetrical Mach-Zehnder interferometers 8 in the third stage is set to ΔL+λ/4n with a phase shift included therein.

Therefore, the length of the electric resistor that configures the first heater 9A and the second heater 9B provided for the asymmetrical Mach-Zehnder interferometer 8 in the first stage from the input side is set to $4L_h$, and the lengths of the electric resistors that configure the first heater 9A and the second heater 9B provided for the asymmetrical Mach-Zehnder interferometers 8 in the second and third stages from the input side are set to $2L_h$ and $L_h$, respectively.

It is to be noted that, while two electric resistors are provided for each of the arms 6 and 7 of the asymmetrical Mach-Zehnder interferometer 8 in each stage so as to form the heaters 9A and 9B, respectively, there is no restriction to the number of electric resistors. For example, one electric resistance may be provided for each of the arms 6 and 7 so as to form the heaters 9A and 9B, respectively, or three or more electric resistors may be provided so as to form the heaters 9A and 9B, respectively. Here, in the case where two or more electric resistors are provided for each of the arms 6 and 7 so as to form the heaters 9A and 9B, respectively, the total length of the two or more electric resistors may vary in proportion to the arm length difference (optical path length difference).

In the second particular example, as depicted in FIG. 9, the demultiplexing unit 1 is structured such that values of electric resistance of the first heater 9A and the second heater 9B provided for the first arm waveguide (long arm) 6 and the second arm waveguide (short arm) 7 of the asymmetrical Mach-Zehnder interferometers 8, respectively, vary in inverse proportion to values of the optical path length difference of the asymmetrical Mach-Zehnder interferometers 8, and all of the first heaters 9A are coupled in parallel to each other by the electric line 16 and all of the second heaters 9B are coupled in parallel to each other by the electric line 16.

It is to be noted that the "value of electric resistance that varies in inverse proportion to the value of optical path length difference" includes not only a value of an electric resistor that fully coincides with a value that varies in inverse proportion to the value of the optical path length difference but also a value of the electric resistor (for example, a value of the electric resistance within a range of an error of approximately 10%) that substantially coincides with a value that varies in inverse proportion to the value of the optical path length difference.

In this case, the plurality of first heaters 9A are each configured from an electric resistor having an electric resistance value that varies in inverse proportion to the optical path length difference and are coupled in parallel to each other, and the plurality of second heaters 9B are each configured from an electric resistor having an electric resistance value that varies in inverse proportion to the optical path length difference and are coupled in parallel to each other.

By configuring the demultiplexing unit 1 in such a configuration as just described, it is possible to cause wavelength shifts to be collectively generated by an equal amount in all of the asymmetrical Mach-Zehnder interferometers 8, for example, by analog signal application.

Especially, wavelength shifts by an equal amount in all of the asymmetrical Mach-Zehnder interferometers 8 can be implemented by providing the first heater 9A and the second heater 9B each having an electric resistance value that varies in inverse proportion to the arm length difference of the asymmetrical Mach-Zehnder interferometers 8 for the long arm 6 and the short arm 7, respectively, and coupling all of the first heaters 9A in parallel to each other and coupling all of the second heaters 9B in parallel to each other.

Further, by configuring the first heater 9A provided for the long arm 6 of the asymmetrical Mach-Zehnder interferometers 8 and the second heater 9B provided for the short arm 7 of the asymmetrical Mach-Zehnder interferometers 8 so as to have a same configuration, wavelength shifts by an equal amount between the wavelength shift to the long wavelength side and the wavelength shift to the short wavelength side can be implemented.

Here, if N same electric resistors are coupled in parallel to each other, then the resistance value decreases to 1/N. Therefore, if the first heater 9A and the second heater 9B each configured from the number of electric resistors, which varies in proportion to the arm length difference, are provided for each arm 8 such that all of the first heaters 9A are coupled in parallel to each other and all of the second heaters 9B are coupled in parallel to each other, then the electric resistance value can be varied in inverse proportion to the arm length difference.

It is to be noted that the method by which the electric resistance value is caused to vary in inverse proportion to the arm length difference is not limited to this, and, for example, the inverse relationship may be implemented by adjusting the length or the sectional area of the electric resistors.

Accordingly, the optical device and the optical apparatus according to the present embodiment have an advantageous effect that wavelength deviation can be reduced to suppress loss and crosstalk.

Consequently, it becomes possible to implement the Dmx function by a process of low processing accuracy and allow the optical device and the optical apparatus to normally function even if temperature variation occurs.

It is to be noted that, while the embodiment described above is directed to an example of a case in which the monitoring optical filter 3 is provided at the input side of the optical filter 2 in the frontmost stage from among the plurality of optical filters 2 (for example, refer to FIG. 5), the disposition of the monitoring optical filter 3 is not limited to this.

For example, the monitoring optical filter 3 may be provided between different stages of the plurality of optical filters 2 as depicted in FIG. 10.

In this case, the optical path length difference of the monitoring optical filter 3 may be set so as to be equal to the optical path length difference of the optical filter in the stage at the input side by one stage.

For example, where the monitoring optical filter 3 is provided for the Dmx device having the structure depicted in FIG. 3 similarly as in the case of the embodiment described above, the demultiplexing unit 1 may be structured such that, between the asymmetrical Mach-Zehnder interferometer 8 in the succeeding stage having the arm length difference (optical path length difference) 2ΔL and the asymmetrical Mach-Zehnder interferometer 8 in the following stage having the arm length difference ΔL, an asymmetrical Mach-Zehnder interferometer 8 having an arm length difference 2ΔL equal to the arm length difference 2ΔL of the asymmetrical Mach-Zehnder interferometer 8 in the succeeding stage is provided as the monitoring optical filter 3 and one of the two output ports of the thus provided asymmetrical Mach-Zehnder interferometer 8 is coupled to the input port of one of the asymmetrical Mach-Zehnder interferometers 8 in the following stage and the other one of the two output ports is coupled to the power monitor (monitoring photodetector) 4.

In this case, in the plurality of optical filters 2, the optical path length difference in a stage at the input side by one stage is doubled with respect to the optical path length difference of the optical filter 2 in a certain stage, and the monitoring optical filter 3 is provided between different stages of the plurality of optical filters 2 and has an optical path length difference equal to the optical path length difference of the optical filter 2 in the stage at the input side by one stage.

In this manner, even if the position at which the asymmetrical Mach-Zehnder interferometer 8 to which the power monitor 4 is coupled is provided and the arm length difference of the asymmetrical Mach-Zehnder interferometer 8 are different, the minimum of the transmission spectrum of the monitor port coincides with a peak of the transmission spectrums of the totaling four output ports of the two asymmetrical Mach-Zehnder interferometers 8 having the arm length difference ΔL and the transmission spectrum (indicated as Mon at the right side in FIG. 10) of the monitor port is minimized in the channel wavelengths ($\lambda_1$ to $\lambda_4$) (refer to the right side of FIG. 10).

Therefore, it is possible to cause all of the asymmetrical Mach-Zehnder interferometers 8 to generate wavelength shifts by an equal amount to adjust the wavelength such that the power (value detected by the monitoring photodetector 4) of the power monitor 4 becomes smallest (is minimized) similarly as in the case of the embodiment described above.

Especially, in the structure of the present modification, since the arm length difference of the asymmetrical Mach-Zehnder interferometer 8 as the monitoring optical filter 3 is smaller than that in the case of the embodiment described above, power necessary for wavelength adjustment can be reduced.

It is to be noted that, although the asymmetrical Mach-Zehnder interferometer as the monitoring optical filter (one monitoring optical filter) 3 is provided at one side (upper side in FIG. 10) between the asymmetrical Mach-Zehnder interferometer 8 in the preceding stage and the asymmetrical Mach-Zehnder interferometer 8 in the following stage and the power monitor (monitoring photodetector; one monitoring photodetector) 4 is coupled to this asymmetrical Mach-Zehnder interferometer, for example, as depicted in FIG. 11, the demultiplexing unit 1 may be structured such that an asymmetrical Mach-Zehnder interferometer 8 as a monitoring optical filter (different monitoring optical filter) 3X is provided also at the other side (lower side in FIG. 10) such that one of the two output ports of the same is coupled to the input port of the other asymmetrical Mach-Zehnder interferometer 8 in the following stage and the other one of the two output ports is coupled to the power monitor (monitoring photodetector; a different monitoring photodetector) 4X.

In this case, the demultiplexing unit 1 includes the different monitoring optical filter 3X that is provided between adjacent stages of the plurality of optical filters 2 and in which the optical path length difference is equal to the optical path length difference of the optical filter 2 in the stage at the input side by one stage and the different monitoring photodetector 4X coupled to the output side of the different monitoring optical filter 3X. The different monitoring optical filter 3X includes the asymmetrical Mach-Zehnder interferometer 8 including the first arm waveguide 6 and the second arm waveguide 7 that have optical path lengths different from each other, and the plurality of wavelength adjustment units 5 are the plurality of optical path length adjustment units 9A and 9B that are provided for at least one of the first arm waveguide 6 and the second arm waveguide 7 included in the asymmetrical Mach-Zehnder interferometer 8 in each of the plurality of optical filters 2, monitoring optical filter 3 and different monitoring optical filter 3X and the optical path length is varied according to the optical path length difference such that wavelength shifts of an equal amount are generated in a same direction.

Further, while the demultiplexing unit 1 includes the two monitoring photodetectors 4 and 4X, wavelength adjustment may be performed using values detected by both of the monitoring photodetectors 4 and 4X or wavelength adjustment may be performed using a value detected by one of the monitoring photodetectors.

By configuring the demultiplexing unit 1 in an upwardly and downwardly symmetrical structure in this manner, the shapes of peaks of the transmission spectrum between channels can be made uniform and crosstalk with an adjacent channel can be suppressed.

Further, for example, the monitoring optical filter 3 may be provided at the output side of the optical filter 2 in the last stage from among the plurality of optical filters 2. In this case, the optical path length difference of the monitoring optical filter 3 may be set, for example, to ½ of the optical path length difference of the optical filter 2 at the last stage.

In this case, in the plurality of optical filters 2, the optical path length difference in the stage at the input side by one stage is doubled with respect to the optical path length difference of the optical filter 2 in a certain stage, and the monitoring optical filter 3 is provided at the output side of the optical filter 2 in the last stage from among the plurality of optical filters 2 and has an optical path length difference equal to ½ of the optical path length difference of the optical filter 2 at the last stage.

For example, in the case where the number of output ports of the optical filter 2 in the last stage from among the plurality of optical filters 2 is four, the monitoring optical filter 3 may be provided for one of the output ports. It is to be noted that the provision of the monitoring optical filter 3 is not limited to this, and the different monitor optical filter may be provided for a different one of the output ports.

It is to be noted that, while the modifications described above exemplify a case in which a WDM signal is demultiplexed into four wavelengths similarly as in the case of the embodiment described above, the demultiplexing is not limited to this, and the present technology can be applied similarly, for example, also to a case in which a WDM signal is demultiplexed into 8 wavelengths, 16 wavelengths or more wavelengths. In this case, the number of stages of the asymmetrical Mach-Zehnder interferometers 8 coupled in multi stages is increased. For example, in the case where a WDM signal is to be demultiplexed into 8 wavelengths, 16 wavelengths or more wavelengths, the number of stages of the asymmetrical Mach-Zehnder interferometers 8 coupled in multiple stages becomes four, five or more. In any case, the asymmetrical Mach-Zehnder interferometer 8 as the monitoring optical filter 3 may be provided between adjacent stages or at the most output side with the power monitor 4 coupled to one of the two output ports. Further, the asymmetrical Mach-Zehnder interferometer 8 as the different monitoring optical filter 3X may be provided and the different power monitor 4X may be coupled to the asymmetrical Mach-Zehnder interferometer 8 as the different monitoring optical filter 3X.

Incidentally, the optical device configured in such a manner as described above and the optical apparatus including the optical device can be applied to an optical receiver or an optical transmitter/receiver (optical transceiver).

Figure 12:
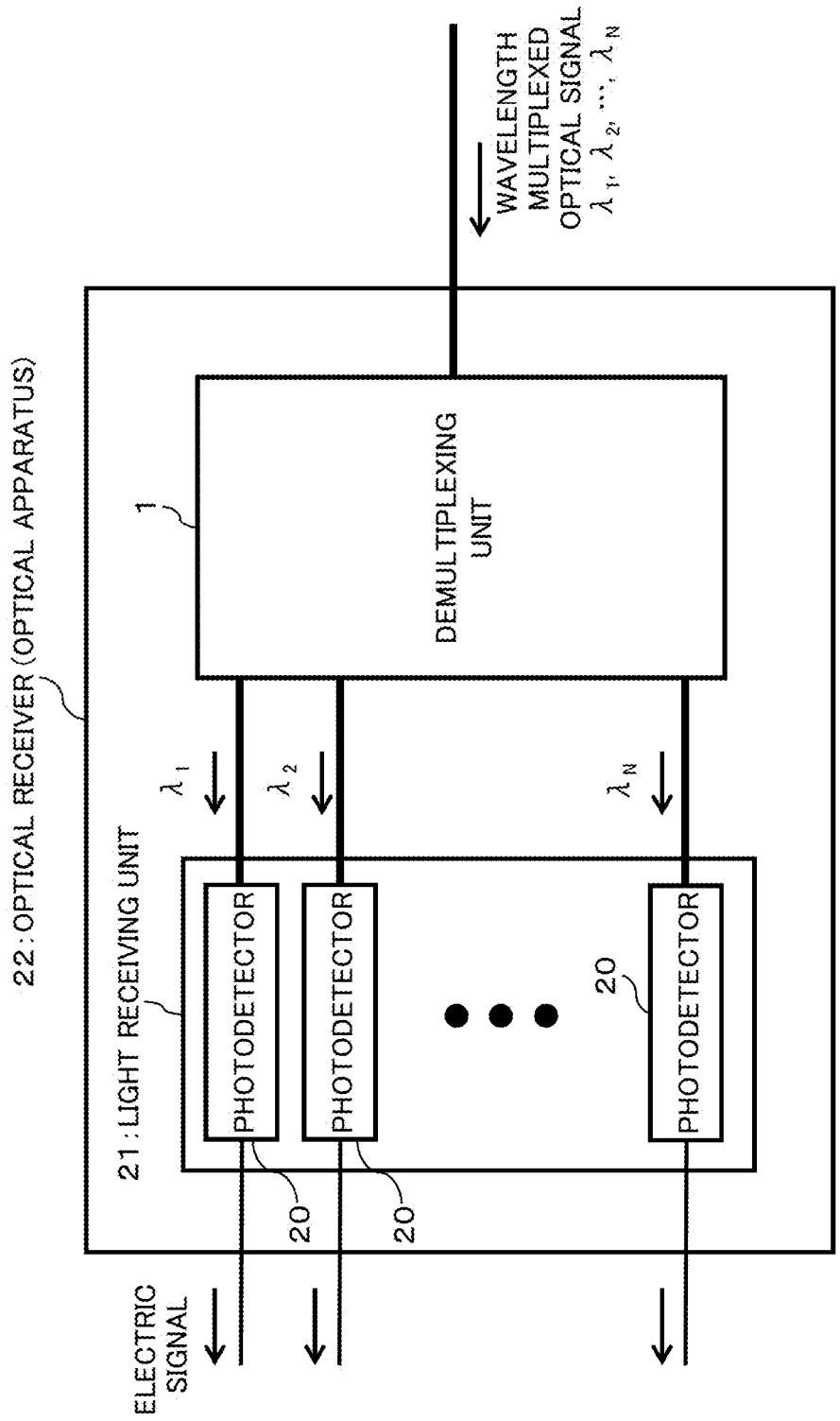
FIG. 12 is a schematic view depicting a configuration of the optical apparatus (optical receiver) according to the present embodiment.

For example, it is possible to configure an optical receiver 22 by configuring, as depicted in FIG. 12, the optical apparatus configured in such a manner as described above so as to include a light receiving unit 21 coupled to the demultiplexing unit 1 and that includes a plurality of photodetectors 20 configured to individually receive a plurality of optical signals (optical signals $\lambda_1$ to $\lambda_n$ having wavelengths different from each other) demultiplexed by the demultiplexing unit 1. Consequently, an optical receiver 22 can be configured. In this case, the optical apparatus is the optical receiver.

Further, for example, as depicted in FIG. 13, in an optical communication system 34 in which optical transceivers (optical transmitters/receivers) 32 each including an optical transmitter 30 and an optical receiver 31 are coupled to each other through optical fibers 33, such an optical receiver 22 as depicted in FIG. 12 can be applied to the optical receivers 31 provided in the optical transceivers 32.

In this case, each optical transceiver 32 includes such an optical receiver 22 as depicted in FIG. 12 as the optical receiver 31 and further includes the optical transmitter 30. In particular, the optical transceiver 32 can be configured by configuring the optical apparatus configured in such a manner as described above so as to include the light receiving unit 21 including the plurality of light receivers 20 and further include a portion that functions as the optical transmitter 30. In this case, the optical apparatus is the optical transceiver.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical device, comprising:
   a demultiplexing unit that performs demultiplexing into a plurality of optical signals having wavelengths different from each other; wherein
   the demultiplexing unit includes:
   a plurality of optical filters that are coupled in multiple stages and in which a period of a peak wavelength of a transmission spectrum differs among different stages;
   a monitoring optical filter coupled to one of the plurality of optical filters;
   a monitoring photodetector coupled to the output side of the monitoring optical filter; and
   a plurality of wavelength adjustment units that are provided individually for the plurality of optical filters and the monitoring optical filter and cause wavelength shifts of an equal amount in a same direction,
   wherein each of the plurality of optical filters and the monitoring optical filter includes an asymmetrical Mach-Zehnder interferometer that includes a first arm waveguide and a second arm waveguide that have optical path lengths different from each other;
   the plurality of optical filters have optical path lengths that differ among different stages; and
   the plurality of wavelength adjustment units are a plurality of first optical path length adjustment units that are provided on the first arm waveguides included in the asymmetrical Mach-Zehnder interferometers of the plurality of optical filters and the monitoring optical filter and each varies the optical path length thereof in response to the optical path length difference to perform wavelength shift to one of the long wavelength side and the short wavelength side, and a plurality of second optical path length adjustment units that are provided on the second arm waveguides included in the asymmetrical Mach-Zehnder interferometers in each of the plurality of optical filters and the monitoring optical filter and each varies the optical path length thereof in response to the optical path length difference to perform wavelength shift to the other one of the long wavelength side and the short wavelength side.

2. The optical device according to claim 1, wherein
the plurality of first optical path length adjustment units are a plurality of first heaters that adjust the temperature of the first arm waveguides; and
the plurality of second optical path length adjustment units are a plurality of second heaters that adjust the temperature of the second arm waveguides.

3. The optical device according to claim 2, wherein
the plurality of first heaters are electrically coupled to each other such that electric current flows collectively; and
the plurality of second heaters are electrically coupled to each other such that electric current flows collectively.

4. The optical device according to claim 3, wherein
the plurality of first heaters are each configured from an electric resistor having an electric resistance value that increases in proportion to the optical path length difference and are coupled in series to each other; and
the plurality of second heaters are each configured from an electric resistor having an electric resistance value that increases in proportion to the optical path length difference and are coupled in series to each other.

5. The optical device according to claim 3, wherein
the plurality of first heaters are each configured from an electric resistor having an electric resistance value that increases in inverse proportion to the optical path length difference and are coupled in parallel to each other; and
the plurality of second heaters are each configured from an electric resistor having an electric resistance value that increases in inverse proportion to the optical path length difference and are coupled in parallel to each other.

6. The optical device according to claim 1, wherein the optical device is a silicon optical integrated device including a core layer configured from silicon.

7. A optical device, comprising:
a demultiplexing unit that performs demultiplexing into a plurality of optical signals having wavelengths different from each other; wherein
the demultiplexing unit includes:
    a plurality of optical filters that are coupled in multiple stages and in which a period of a peak wavelength of a transmission spectrum differs among different stages;
    a monitoring optical filter coupled to one of the plurality of optical filters;
    a monitoring photodetector coupled to the output side of the monitoring optical filter; and
    a plurality of wavelength adjustment units that are provided individually for the plurality of optical filters and the monitoring optical filter and cause wavelength shifts of an equal amount in a same direction,
wherein each of the plurality of optical filters and the monitoring optical filter includes an asymmetrical Mach-Zehnder interferometer that includes a first arm waveguide and a second arm waveguide that have optical path lengths different from each other;
the plurality of optical filters have optical path lengths that differ among different stages;
the plurality of wavelength adjustment units are a plurality of optical path length adjustment units each of which is provided on at least one of the first arm waveguide and the second arm waveguide included in the asymmetrical Mach-Zehnder interferometer included in each of the plurality of optical filters and the monitoring optical filter and varies the optical path length thereof in response to the optical path length difference;
the plurality of optical filters have such optical path length differences that, in comparison with the optical path length of the optical filter in a certain stage, the optical path length difference of the optical filter in a stage at the input side by one stage is doubled; and
the monitoring optical filter is provided at the input side of the optical filter in the frontmost stage from among the plurality of optical filters and has the optical path length difference that is doubled with respect to the optical path length difference of the optical filter in the frontmost stage.

8. A optical device, comprising:
a demultiplexing unit that performs demultiplexing into a plurality of optical signals having wavelengths different from each other; wherein
the demultiplexing unit includes:
    a plurality of optical filters that are coupled in multiple stages and in which a period of a peak wavelength of a transmission spectrum differs among different stages;
    a monitoring optical filter coupled to one of the plurality of optical filters;
    a monitoring photodetector coupled to the output side of the monitoring optical filter; and
    a plurality of wavelength adjustment units that are provided individually for the plurality of optical filters and the monitoring optical filter and cause wavelength shifts of an equal amount in a same direction,
wherein each of the plurality of optical filters and the monitoring optical filter includes an asymmetrical Mach-Zehnder interferometer that includes a first arm waveguide and a second arm waveguide that have optical path lengths different from each other;
the plurality of optical filters have optical path lengths that differ among different stages;
the plurality of wavelength adjustment units are a plurality of optical path length adjustment units each of which is provided on at least one of the first arm waveguide and the second arm waveguide included in the asymmetrical Mach-Zehnder interferometer included in each of the plurality of optical filters and the monitoring optical filter and varies the optical path length thereof in response to the optical path length difference;
the plurality of optical filters have such optical path length differences that, in comparison with the optical path length of the optical filter in a certain stage, the optical path length difference of the optical filter in a stage at the input side by one stage is doubled; and
the monitoring optical filter is provided between each adjacent ones of the stages of the plurality of optical filters and has the optical path length difference equal to that of the optical filter in the stage at the input side by one stage.

9. The optical device according to claim 8, further comprising:
a different monitoring optical filter that is provided between each adjacent ones of the stages of the plurality of optical filters and has the optical path length difference equal to that of the optical filter in the stage at the input side by one stage; and
a different monitoring photodetector coupled to the output side of the different monitoring optical filter; wherein
the different monitoring optical filter includes an asymmetrical Mach-Zehnder interferometer including a first arm waveguide and a second arm waveguide that have the optical path lengths different from each other; and
the plurality of wavelength adjustment units are a plurality of optical path length adjustment units each of which is provided on at least one of the first arm waveguide and the second arm waveguide included in the asymmetrical Mach-Zehnder interferometer included in each of the plurality of optical filters, the monitoring optical filter and the different monitoring optical filter and varies the optical path length thereof in response to the optical path length difference to cause wavelength shifts of an equal amount in a same direction.

10. An optical apparatus, comprising:
an optical device including a demultiplexing unit that performs demultiplexing into a plurality of optical signals having wavelengths different from each other; and
a controller coupled to the optical device; wherein
the demultiplexing unit includes:
a plurality of optical filters that are coupled in multiple stages and in which a period of a peak wavelength of a transmission spectrum differs among different stages;
a monitoring optical filter coupled to one of the plurality of optical filters;
a monitoring photodetector coupled to the output side of the monitoring optical filter; and
a plurality of wavelength adjustment units that are provided individually for the plurality of optical filters and the monitoring optical filter and cause wavelength shifts of an equal amount in a same direction; and
the controller performs control for the plurality of wavelength adjustment units based on a value detected by the monitoring photodetector,
wherein each of the plurality of optical filters and the monitoring optical filter includes an asymmetrical Mach-Zehnder interferometer that includes a first arm waveguide and a second arm waveguide that have optical path lengths different from each other;
the plurality of optical filters have optical path lengths that differ among different stages;
the plurality of wavelength adjustment units are a plurality of optical path length adjustment units each of which is provided on at least one of the first arm waveguide and the second arm waveguide included in the asymmetrical Mach-Zehnder interferometer included in each of the plurality of optical filters and the monitoring optical filter and each varies the optical path length thereof in response to the optical path length difference; and the controller performs control for the plurality of optical path length adjustment units such that a value detected by the monitoring photodetector is minimized.

11. The optical apparatus according to claim 10, wherein
the plurality of wavelength adjustment units are a plurality of first optical path length adjustment units that are provided on the first arm waveguides included in the asymmetrical Mach-Zehnder interferometers in each of the plurality of optical filters and the monitoring optical filter and each varies the optical path length thereof in response to the optical path length difference to perform wavelength shift to one of the long wavelength side and the short wavelength side, and a plurality of second optical path length adjustment units that are provided on the second arm waveguides included in the asymmetrical Mach-Zehnder interferometers in each of the plurality of optical filters and the monitoring optical filter and each varies the optical path length thereof in response to the optical path length difference to perform wavelength shift to the other one of the long wavelength side and the short wavelength side; and
the controller performs control for the plurality of first optical path length adjustment units and the plurality of second optical path length adjustment units such that the value detected by the monitoring photodetector is minimized.

12. The optical apparatus according to claim 11, wherein
the controller performs control for the plurality of first optical path length adjustment units and the plurality of second optical path length adjustment units such that the value detected by the monitoring photodetector is minimized based on a first detection value acquired from the monitoring photodetector by performing the control for the plurality of first optical path length adjustment units and a second detection value acquired from the monitoring photodetector by performing the control for the plurality of second optical path length adjustment units.

13. The optical apparatus according to claim 11, wherein
the plurality of first optical path length adjustment units are a plurality of first heaters that adjust the temperature of the first arm waveguides and are electrically coupled to each other;
the plurality of second optical path length adjustment units are a plurality of second heaters that adjust the temperature of the second arm waveguides and are electrically coupled to each other; and
the controller performs control for the plurality of first optical path length adjustment units such that electric current flows collectively to the plurality of first heaters and performs control for the plurality of second optical path length adjustment units such that electric current flows collectively to the plurality of second heaters.

14. The optical apparatus according to claim 13, wherein
the plurality of first heaters are each configured from an electric resistor having an electric resistance value that increases in proportion to the optical path length difference and are coupled in series to each other; and
the plurality of second heaters are each configured from an electric resistor having an electric resistance value that increases in proportion to the optical path length difference and are coupled to in series to each other.

15. The optical apparatus according to claim 13, wherein
the plurality of first heaters are each configured from an electric resistance having an electric resistance value that increases in inverse proportion to the optical path length difference and are coupled in parallel to each other; and the plurality of second heaters are each configured from an electric resistor having an electric resistance value that increases in inverse proportion to the optical path length difference and are coupled in parallel to each other.

16. The optical apparatus according to claim 10, further comprising:
a light receiving unit coupled to the demultiplexing unit and including a plurality of photodetectors that receive a plurality of optical signals demultiplexed by the demultiplexing unit.

17. The optical apparatus according to claim 16, further comprising:
a portion that functions as an optical transmitter.

* * * * *